Feb. 7, 1961 E. F. WEBB 2,970,336
WINDSHIELD CLEARING SYSTEM
Filed May 7, 1958 2 Sheets-Sheet 1

INVENTOR.
EDMOND F. WEBB
BY
ATTORNEY

Feb. 7, 1961 E. F. WEBB 2,970,336
WINDSHIELD CLEARING SYSTEM
Filed May 7, 1958 2 Sheets-Sheet 2
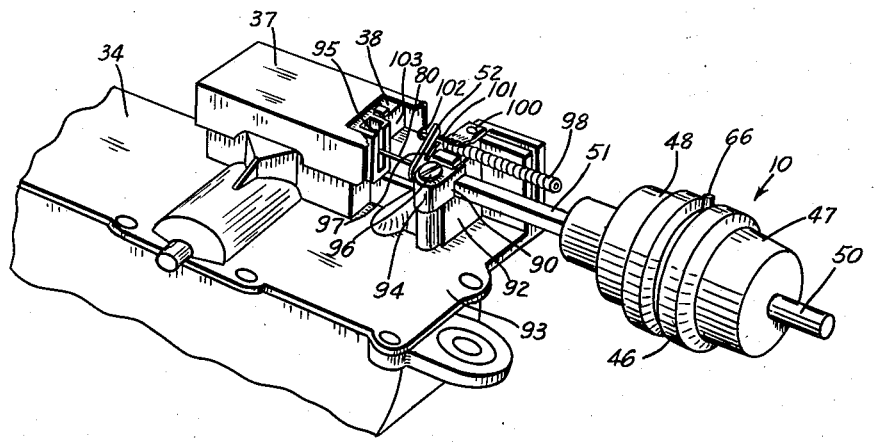
Fig. 3
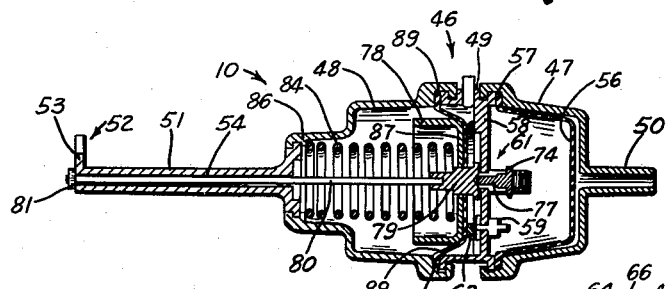
Fig. 4
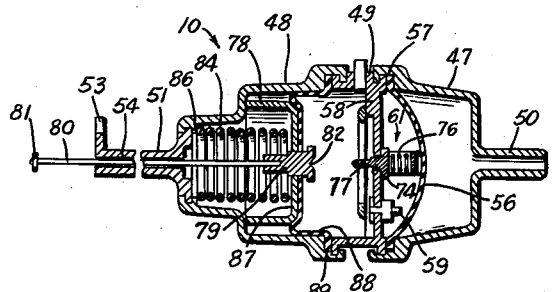
Fig. 5
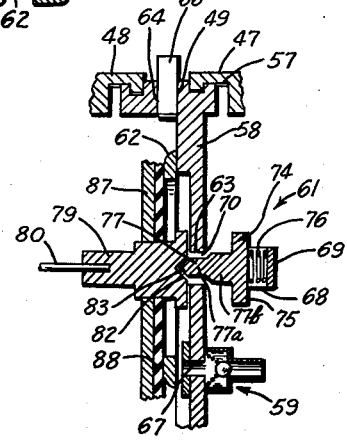
Fig. 6
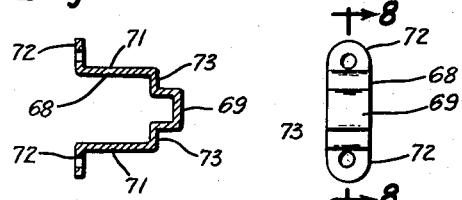
Fig. 8    Fig. 7
INVENTOR.
EDMOND F. WEBB
BY
ATTORNEY United States Patent Office 2,970,336
Patented Feb. 7, 1961

2,970,336

WINDSHIELD CLEARING SYSTEM

Edmond F. Webb, Franklin, Mich., assignor to The Delman Company, Cookeville, Tenn., a corporation of Tennessee Filed May 7, 1958, Ser. No. 733,621

7 Claims. (Cl. 15—250.02)

This invention relates to vehicle windshield clearing systems and more particularly to a system providing for the concurrent operation of a wiper unit and a washer unit and for operation of the wiper unit independently of the washer unit.

An object of this invention is to provide in a windshield clearing system an improved arrangement for concurrent operation of a wiper unit and a washer unit.

Another object of this invention is to provide in a windshield clearing system using a pressurized fluid for washing the windshield, a utilization of such pressurized fluid for concurrent operation of a wiper unit and a washer unit.

Yet another object of this invention is to provide in a windshield clearing system wherein a lever is manually operated to actuate a washer unit, means fluid responsive to the actuation of such washer unit for turning on a wiper unit and for turning off the wiper unit at an interval of time subsequent to the de-actuation of the washer unit by the lever.

A further object of this invention is to provide in a washer system having a wiper unit and a washer unit, a device interposed in the fluid transmitting lines of the washer unit which is operatively connected to the wiper unit and fluid responsive to the actuation and the de-actuation of the washer unit, to concurrently actuate the wiper unit with the washer unit, and to de-actuate the wiper unit at an interval of time subsequent to the de-actuation of the washer unit.

Another object of this invention is to provide in a washer system having a wiper unit and a washer unit, means including a triumvirate of power transmitting devices each of which is responsive to another and the first of which is fluid responsive to the actuation of such washer unit, the second of which is operatively connected to the wiper unit, and the third of which is operable to transmit power between the first device and the second device at a differential rate of transmission.

An object of this invention is to provide an arrangement for attaining the above mentioned objectives which is economical to manufacture, easy to install, and effective in service and operation.

These objects and other advantages will become readily apparent by reference to the following description when taken in conjunction with the accompanying drawings, wherein:

Fig. 3 is an enlarged perspective view of a portion of the wiper motor and the time delay device of this invention;

Fig. 4 is an enlarged longitudinal sectional view of the time delay device of this invention, with the internal mechanism thereof shown in a normal or rest position;

Fig. 5 is a foreshortened view similar to Fig. 4, wherein the internal mechanism of the time delay device is shown in operative position;

Fig. 6 is an enlarged fragmentary sectional view of certain parts of Fig. 4, with some parts broken away for the purpose of clarity; and Figs. 7 and 8 are enlarged detail views of the retainer element of Fig. 6.

Figure 1:
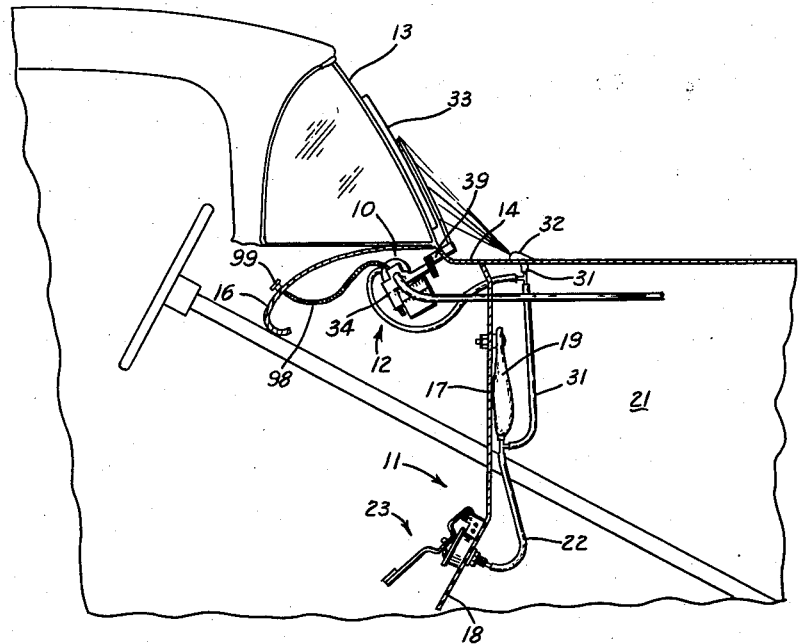
Fig. 1 is a foreshortened, fragmentary view of a vehicle showing the invention in assembled relation therewith.

With reference to the drawing, the time delay device of this invention, indicated generally at 10, is illustrated in Fig. 1 in assembly relation with a vehicle windshield clearing system which includes a windshield washer unit and a windshield wiper unit designated generally as 11 and 12, respectively. The vehicle is illustrated as having a windshield 13, an engine cowl 14 extended forwardly of the windshield, and an instrument panel or dashboard 16 located rearwardly of the windshield 13. The vehicle is further equipped with the usual upright firewall 17 and an upwardly and forwardly inclined floorboard or toeboard section 18 which joins with the lower end of the firewall 17.

The windshield washer unit 11 includes a flexible bag-type water container or reservoir 19 mounted on the firewall 17 within the engine compartment 20 and communicating through a fluid line or hose 22 with a foot operated pump unit 23 clamped to the top side, and projected through the inclined floorboard section 18.

Figure 2:
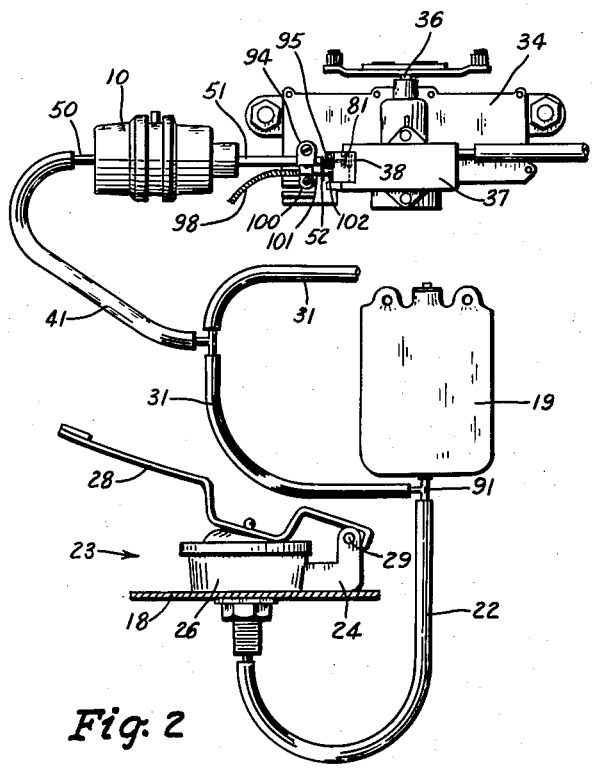
Fig. 2 is an enlarged composite illustration of the wiper motor, pump structure and time delay device shown in Fig. 1, with the motor being shown in plan and the pump structure in side elevational, and with some parts broken away for the purpose of clarity.

As best appears in Fig. 2, the pump unit 23 generally includes a bracket member 24 having a cup-shaped portion 26 formed integral therewith and open at the top. Extended across the open top of the portion 26 is an extensible diaphragm (not shown) whereby a fluid tight chamber is formed within the portion 26. An irregular shaped operating lever 28 is pivotally connected at one end by a pivot 29 to the bracket member 24 and operates on downward pivotal movement thereof to distend the diaphragm within the portion 26 and thus expel fluid therefrom. The fluid is then transmitted through the hose 22 and a hose 31 (Fig. 2) to a nozzle 32 (Fig. 1) mounted on the cowl 14. The operating lever 28 is biased whereby to be raised from the depressed position to thus allow the diaphragm to contract and to withdraw fluid from the reservoir 19 through the hose 22.

The wiper unit 12 includes a windshield wiper 33 and a suction motor 34 (Figs. 1 and 2) of a conventional type, having a drive shaft 36 and provided with a valve unit 37 (Figs. 2 and 3) for controlling operation of the motor 34. The valve 37 is operated by a reciprocally movable control member 38. The motor drive shaft 36 is connected to the wiper 33 through a transmission mechanism indicated at 39 in Fig. 1.

As best appears in Fig. 2, the time delay device 10 is fluid connected by a hose 41 to the hose 31 connected between the reservoir 19 and the nozzle 32. The device 10 is adapted, as will be described hereinafter in detail, to start the wiper motor 34 concurrently with the downward movement of the operating lever 28, which movement actuates the washer unit 11. While the lever 28 is in a depressed position, the time delay device 10 is conditioned to initiate a time delay action so that the wiper motor 34 continues to operate for a time interval after the lever 28 has been released to stop the operation of the washer unit 11.

Referring now particularly to Figs. 3-6, the time delay device 10 is comprised generally of an elongated cylindrical body or housing 46 which includes a pair of hollow end sections 47 and 48 arranged in a face to face relation and separated in a fluid tight manner by a valve plate unit 49. The end section 47 includes a tubular extension member 50 which is adapted to be fitted to the hose 41 (Fig. 2), and the end section 48 is provided with an elongated extension 51, square in transverse cross section, having a yoke 52 formed at the end thereof by a pair of spaced bifurcations 53. A bore 54 is formed through the square extension 51.

A flexible diaphragm 56 is mounted within the end section 47 with its peripheral edge secured in a fluid tight manner at the junction 57 between the end section 47 and the valve unit 49. The valve plate unit 49 includes a plate member 58, which forms a fluid tight wall between the end sections 47 and 48, an inlet valve unit 59 secured to the plate member 58, and an outlet valve unit 61 which is also secured to the plate member 58. A circular washer member 62 is secured to the side of the plate member 58 facing the end section 48, and a passage 63 is formed centrally in the plate member 58 for a purpose hereinafter described. An opening 64 (Fig. 6) is formed in the periphery of the valve plate unit 49 whereby to open the end section 48 to the atmosphere, a plug member 66 being normally inserted in the opening 64.

The inlet valve unit 59 comprises generally a conventional one-way ball type check valve mounted adjacent an opening 67 formed in the plate member 58, and is operable to permit a flow of fluid from the end section 47 through the opening 67 to the end section 48, but arranged to prevent a reverse flow or a flow from the end section 48 through the passage 67 to the end section 47.

The outlet valve unit 61, which operates as a bleed valve, comprises a generally U-shaped retainer 68 (Figs. 7 and 8) having a base portion 69 connected between a pair of transversely spaced legs 71 formed with outwardly extended flanges 72 at their outer ends to adapt the retainer 68 for mounting to the side of the plate member 58 facing the end section 47. The junction between each leg 71 and the base portion 69 is in the form of a shoulder 73 against which the circular head portion 74 (Fig. 6) of a bleed plug 75 is adapted to seat.

The bleed plug 75 includes the circular head portion 74 and a shaft end 77 comprising two portions 77a and 77b. The portion 77a is the outermost portion and has a diameter slightly smaller than the portion 77b, while in turn the inner portion 77b has a diameter slightly smaller than that of the opening 63 in the plate member 58. A coil spring 76 is arranged between the retainer seat 69 and the head portion 74 to bias the bleed plug shaft 77 through the opening 63.

Mounted within the end section 48 is a cup-shaped retainer 78 the concave side of which faces the outer end of the section 48. An actuator head 79, mounted centrally of the retainer 78, is connected at one end with an actuator wire 80, extended through the bore 54 of the square extension 51, and having a bead 81 formed on the outer end. A depression 82 formed in the other end of the actuator head 79 is adapted to receive the pointed end 83 (Fig. 6) of the bleed plug shaft 77. The retainer 78 is biased toward a position, as shown in Fig. 4, by a coil spring 84 which is arranged between the base portion 87 of the retainer 78 and a circular shoulder 86 formed within the outer end of the end section 48.

A flexible diaphragm 88 is secured at its peripheral edge in a fluid tight manner to the junction 89 (Fig. 4) between the end section 48 and the valve plate unit 49, and is adapted to assume a normal position best indicated in Fig. 4, wherein the diaphragm 88 is contiguous with the surface of the convex side of the retainer facing the valve plate member 58.

Of note, the internal arrangement of the time delay device 10 is such that the two cavities or chambers formed by the separation of the end sections 47 and 48 by the valve plate unit 49 are each divided into two expansible compartments by virtue of the diaphragm 56 mounted within the section 47 and by the diaphragm 88 mounted within the section 48 (Fig. 4). It is noted additionally that by connecting the tubular extension 50 of the end section 47 to the hose 41, which in turn is connected in the hose line 31 leading from the reservoir 19 to the nozzle 32, the diaphragm 56 is responsive to the flow and lack of flow of pressurized fluid through the hose 31.

Referring particularly to Fig. 2, it is seen that the connection of the hoses 31 and 22 to the reservoir 19 is via a valve unit 91. This unit 91 permits fluid to flow from the pump unit 23 through the hoses 22 and 31 to the nozzle when the lever 28 is depressed; but when the lever 28 is raised, the valve unit 91 acts to shut off the hose 31 from the remainder of the washer unit 11 while permitting a withdrawal of fluid from the reservoir 19 to the pump unit 23, thus readying the pump unit 23 for a subsequent lever depression and washer unit actuation.

For the purpose of transmitting power generated by the movement of the diaphragm 56 from its normal position (Fig. 4) to an actuated position (Fig. 5), so as to in turn move the diaphragm 88 and the retainer 78 against the compression of the coil spring 84, a liquid such as oil is inserted into the section 48 through the opening 64 (Fig. 6). Of importance, the liquid, initially trapped between the diaphragm 88 and the plate member 58, bleeds through the space 70 provided between the passage 63 and the bleed plug shaft 77 and into the compartment between the plate member 58 and the diaphragm 56.

Thus, the time delay device 10 includes a triumvirate of responsively related power transmitting means, namely: the diaphragm 56; the liquid trapped on both sides of the plate member 58 but movable therethrough due to the valve units 59 and 61; and the diaphragm 88.

Referring to Figs. 2 and 3, the mounting arrangement of the device 10 relative to the wiper motor 34 is disclosed. The time delay device 10 is slidably mounted on a bracket (not shown) so that the square extension 51 extends through a slot 90 formed by a stand 92 (Fig. 3), integral with the motor top plate 93, and by a guide element 94 secured to the stand 92 by a bolt 96. Thus the device 10 is adapted to move back and forth relative to the wiper motor 34. The slot 90 is aligned with the control member 38 whereby the bead 81 formed on the outer end of the actuating wire 80 is adapted to be connected to a slotted portion 95 of the member 38 (Fig. 2).

By virtue of the mounting arrangement of the extension 51, the yoke 52 is located in a position wherein the space 97 (Fig. 3) between the bifurcations 53 is aligned with a portion 103 of the control member 38. Thus, by securing, as by a clamping device 100, a Bowden wire unit 98, which leads from a hand control knob 99 mounted on the dashboard 16, in a groove (not shown) provided therefor on the stand 92, the Bowden wire 101 extends between the bifurcations 53. A bead 102 at the end of the wire 101 is thus located between the yoke 52 and the portion 103 of the control member for a purpose hereinafter described.

In the operation of the time delay device 10, let it be assumed that the position of the elements disposed therein as viewed in Fig. 4 correspond to an inactive or rest condition of the windshield clearing system. In this condition, the operating lever 28 is in a normally raised or released position and the time delay device 10 is in a position wherein the control member 38 for the wiper motor control valve 37 is in a non-actuated position protruded from the valve 37 (Fig. 2). To actuate the wiper and washer units, the operating lever 28 is moved downwardly by the vehicle operator's foot whereby to distend the diaphragm (not shown) mounted in the pump portion 26 and thus to force fluid therefrom through the hoses 22 and 31 to be discharged through the nozzle 32 against the windshield 13.

On downward movement of the operating lever 28, the discharge flow of pressurized fluid through the hose 31 is transmitted also through the hose 41 and into the end section 47 of the time delay device 10 and forces the diaphragm 56 to the left, as viewed in Fig. 5. This movement of the diaphragm 56 in turn forces the liquid between the diaphragm 56 and the plate member 58 through the inlet valve unit 59 at a certain rate of flow and into the compartment between the diaphragm 88 and the plate member 58.

The increased quantity and pressure of the liquid in turn forces the diaphragm 88 and the retainer 78 from their position in Fig. 4 to the position of Fig. 5, whereby the actuator head 79 and the actuator wire 80 are also moved to the left (Figs. 3 and 5). The resulting movement of the actuator wire 80 forces the control member 38 into the valve 37 (Fig. 3) whereby to start the wiper motor 34. Thus, concurrently with the downward movement of the operating lever 28 to discharge fluid through the hoses 22 and 31, the time delay device 10 starts the operation of the wiper unit 12.

It may be noted that as the actuator bead 79 moves to the left, it moves out of contact with the point 83 of the bleed plug shaft 77, whereby the plug 75 is moved from its position of Fig. 4 to a position best shown in Fig. 5, due to the expansion force of the coil spring 76. This movement of the plug 75 locates the shaft portion 77b within the opening 63.

On being released, the operating lever 28 is raised and the diaphragm mounted within the bracket portion 26 is withdrawn from its distended position whereby a suction pressure is created to withdraw fluid from the reservoir 19. Concurrently with the upward movement of the operating lever 28, the valve unit 91 acts to shut off the flow of fluid through the hose 31 and to thus, in effect, depressurize the quantity of fluid remaining in the hoses 31 and 41.

By releasing the fluid pressure against the diaphragm 56 (Fig. 5), the liquid trapped between the diaphragm 88 and the plate member 58 is now subjected to the pressure of the biased retainer 78 and the diaphragm 88 tending to move to the right to thus return to its normal position. This pressure forces a slow bleeding of the liquid back through the space between the portion 77b of the bleed shaft 77 at a rate of flow slower than that through the inlet valve 59, whereby the diaphragm 88 and retainer 78 move slowly toward the right. Before the diaphragm 88 reaches its inoperative position of Fig. 4, the actuator bead 79, at its depression 82, contacts the bleed shaft point 83 and forces the bleed plug 75 to the right, as viewed in Fig. 4, and against the compression of the spring 76. This movement locates the shaft portion 77a within the opening 63, and as the area between the shaft 77 and the opening 63 is increased by virtue of the smaller diameter of the portion 77a relative to that of the portion 77b, the rate of escape of the liquid through the opening 63 is now increased and concurrently, the diaphragm 88, retainer 78 and also the wire 80 move faster to the right.

Thus, a sequential slow-fast liquid bleed occurs, i.e., an initial slow bleed to delay the action of the control member 38 in stopping the motor 34, and a final fast bleed to assure a quick positive movement of the member 38 to its position for stopping the motor 34. Upon upward movement, then, of the operating lever 28 to de-actuate the washer unit 11 with respect to its discharging of fluid against the windshield 13, the time delay device 10 concurrently initiates a time delay operation calculated to continue operation of the wiper unit 12 for an interval of time subsequent to the de-actuation of the washer unit 11.

Of note, the movement of the actuating wire 80 by virtue of the movement of the retainer 78 is relative to the yoke 52 and in no way affects the hand operated Bowden wire unit 98 (Fig. 3). Hand actuated movement, however, of the Bowden wire unit 98 to turn on the wiper motor 37 is also operable to cause the entire time delay device 10 to move toward the wiper motor 34. This occurs due to the bead 102 of the hand wire 101 contacting the portion 103 and forcing the control member 38 inwardly of the valve 37, which in turn, by virtue of the connection of the delay actuating wire 80 with the control member 38, tends to move the wire 80 also toward the motor 34. As such movement of the wire 80 is resisted by the force of the spring 84 against the retainer 78, which force is greater than that frictional force restraining the device 10 from sliding, the device 10 moves forward toward the wiper motor concurrently with movement of the hand operated bead 102.

On return movement or movement away from the wiper motor 34 of the wire 101, the bead 102, after moving a predetermined distance, contacts the yoke 52 and thus forces the entire delay device 10 to move away from the motor 34 to its original position (Fig. 3). Here again, due to the resistance to compression of the delay device spring 84 being greater than the resistance to movement of the control member 38, by virtue of the connection of the wire 80 with the member 38, the control member 38 is moved outwardly of the valve 37 concurrently with the movement of the hand actuated Bowden wire 98 to an inoperative position. Thus, the operation of the wiper unit 12 may be either independently of or concurrently with the operation of the washer unit 11, and when such operation is independently made, it does not affect the internal mechanism of the device 10.

Although a preferred embodiment of the invention has been disclosed herein, it is not to be so limited as various modifications and alternate constructions may be made therein which are within the full intended scope of the invention as defined in the appended claims.

I claim:

1. A vehicle windshield clearing system comprising, a nozzle device for spraying a fluid onto the windshield, fluid reservoir means, pump means, operator controlled means for operating said pump means, fluid transmitting means interconnecting said nozzle device, said reservoir means, and said pump means, said pump means operable to discharge said fluid through said nozzle device and to withdraw said fluid from said reservoir means, a windshield wiper motor, and time delay means including flexible means interposed in said fluid transmitting means and responsive to the discharge flow of fluid therethrough, hydraulic means responsive to said flexible means, and actuating means mechanically associated with said wiper motor and responsive to the said hydraulic means, said hydraulic means movable in one direction at a first rate whereby to force said actuating means to start said wiper motor, and movable in an opposite direction at a second rate slower than said first rate whereby to stop said motor subsequent to the stopping of said fluid discharge.

2. A vehicle windshield clearing system comprising, a nozzle device for spraying a fluid onto the windshield, fluid reservoir means, pump means, operator controlled means for operating said pump means, fluid transmitting means interconnecting said nozzle device, said reservoir means, and said pump means, said pump means operable to discharge said fluid through said nozzle device and to withdraw said fluid from said reservoir means, a windshield wiper motor, and time delay means including a hydraulically operated actuating unit and a diaphragm unit, said actuating unit mechanically associated with said wiper motor and movable at a first rate to a position to start said motor and movable at a second rate slower than said first to a position to stop said motor, said diaphragm unit being interposed in said fluid interconnecting means and responsive to the flow of said discharge fluid therethrough and operatively associated with said actuating unit to operate said wiper motor in response to movement of said diaphragm unit.

3. A vehicle windshield clearing system comprising, a nozzle device for spraying a fluid onto the windshield, fluid reservoir means, pump means, operator controlled means for operating said pump means, fluid transmitting means interconnecting said nozzle device, said reservoir means, and said pump means, said pump means operable to discharge said fluid through said nozzle device and to withdraw said fluid from said reservoir means, a windshield wiper motor, and time delay means including a housing having a first chamber and a second chamber separated by a wall formed within said housing, a diaphragm unit arranged in said first chamber and fluid connected with said fluid transmitting means whereby said diaphragm unit is responsive to said fluid discharge, a fluid responsive actuating unit arranged in said second chamber and mechanically associated with said wiper motor for control thereof, a liquid disposed on both sides of said wall in contacting relation with said diaphragm unit and said actuating unit, and valve means mounted on said wall operable to transmit said liquid from the diaphragm unit side thereof to said actuating unit side thereof at one rate, and to transmit said liquid from the actuating unit side to said diaphragm unit side at another rate slower than said one rate.

4. In a vehicle windshield clearing system including a windshield wiper, a power unit for operating said wiper having a reciprocally movable control member, a nozzle, a pump unit, and fluid transmitting means connecting the nozzle and the pump unit whereby actuation of the pump unit supplies fluid under pressure to the nozzle; time delay means for operating said control member in response to operation of said pump unit comprising, first means movably responsive to said fluid under pressure, fluid responsive second means operatively associated with said control member, means forming a chamber interposed between said first and second means, a liquid trapped in said chamber and contacting said first and second means, means dividing said chamber into two compartments each filled with said liquid, and valve means secured to said dividing means and adapted to transmit said liquid from the compartment adjacent said first means to the compartment adjacent said second means at one rate, and to transmit said liquid from the compartment adjacent said second means to the compartment adjacent said first means at a rate slower than said one rate.

5. In a vehicle windshield clearing system including a windshield wiper, a power unit for operating said wiper having a reciprocally movable control member, a nozzle, a pump unit, and fluid transmitting means connecting the nozzle and the pump unit whereby actuation of the pump unit supplies fluid under pressure to the nozzle; time delay means for operating said control member in response to operation of said pump unit comprising, a housing, a diaphragm unit mounted in said housing and responsive to said supply of fluid under pressure, an actuating unit mounted in said housing and operatively associated with said control member, means biasing said actuating unit toward an inoperative position and power transmitting means arranged in said housing and operable to transmit power from said diaphragm unit to said actuating unit at a first rate of transmission whereby to start said power unit, and operable to transmit power from said actuating unit to said diaphragm unit at a second rate slower than said first rate whereby to stop said power unit subsequent to the de-actuation of said pump unit.

6. In a vehicle windshield clearing system including a windshield wiper, a power unit for operating said wiper having a reciprocally movable control member, a nozzle, a pump unit, and fluid transmitting means connecting the nozzle and the pump unit whereby actuation of the pump unit supplies fluid under pressure to the nozzle; time delay means for operating said control member in response to operation of said pump unit comprising, a housing, a diaphragm unit mounted in said housing and fluid connected in said fluid transmitting means and responsive to said fluid under pressure, an actuating unit mounted in said housing and operatively associated with said control member, means biasing said actuating unit toward a position wherein said wiper motor is non-operative, and power transmitting means including a liquid trapped between said diaphragm unit and said actuating unit, and including further valve means dividing said liquid into two expansible compartments and operable to pass said liquid from the compartment adjacent said diaphragm unit to the compartment adjacent said actuating unit at one rate whereby to start said power unit, and to transmit said liquid from the compartment adjacent said actuating unit to the compartment adjacent said diaphragm unit at another rate slower than said one rate whereby to stop said power unit subsequent to the deactuation of said pump unit.

7. In a vehicle windshield clearing system including a windshield wiper, a power unit for operating said wiper having a reciprocally movable control member, a nozzle, a pump unit, and fluid transmitting means connecting the nozzle and the pump unit whereby actuation of the pump unit supplies fluid under pressure to the nozzle; time delay means including a housing, means within said housing dividing said housing into a first chamber and a second chamber, means forming an opening in said housing and fluid connecting said first chamber with said fluid transmitting means, an extensible diaphragm member mounted in said first chamber, a quantity of liquid held between said diaphragm member and said dividing means, said diaphragm member responsive to said fluid discharge whereby to move toward said dividing means, valve means mounted on said dividing means and operable to transmit said liquid from said first chamber to said second chamber at a first rate, and operable further to transmit said liquid from said second chamber to said first chamber at a reduced rate, and extensible diaphragm means mounted in said second chamber and operatively associated with said control member, said diaphragm means responsive to said liquid in said second chamber for actuating said control member and thus said wiper motor in response to movement of said diaphragm member.

References Cited in the file of this patent
FOREIGN PATENTS
1,111,220    France   ---------------- Oct. 26, 1955